United States Patent
Zhang et al.

(10) Patent No.: US 11,582,449 B2
(45) Date of Patent: Feb. 14, 2023

(54) METHOD FOR IMAGE ENCODING, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Jiaojiao Zhang, Beijing (CN); Wenpeng Ding, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/338,259

(22) Filed: Jun. 3, 2021

(65) Prior Publication Data
US 2021/0297664 A1 Sep. 23, 2021

(30) Foreign Application Priority Data
Jun. 30, 2020 (CN) .......................... 202010620842.2

(51) Int. Cl.
*H04N 19/11* (2014.01)
*H04N 19/147* (2014.01)
(Continued)

(52) U.S. Cl.
CPC ........... *H04N 19/11* (2014.11); *H04N 19/147* (2014.11); *H04N 19/159* (2014.11); *H04N 19/176* (2014.11)

(58) Field of Classification Search
CPC .... H04N 19/11; H04N 19/147; H04N 19/159; H04N 19/176; H04N 19/593; H04N 19/146
See application file for complete search history.

(56) References Cited

U.S. PATENT DOCUMENTS 11,451,772 B2 * 9/2022 Luo ...................... H04N 19/159
2015/0016521 A1 * 1/2015 Peng ..................... H04N 19/119
375/240.12
(Continued)

FOREIGN PATENT DOCUMENTS

CN 102665079 A * 9/2012
CN 102665079 A 9/2012
(Continued)

OTHER PUBLICATIONS

Liang Zhao et al., (hereinafter Zhao) "Further Improvement for Intra Mode Decision", JCT-VC-D283, Daegu, KR, Jan. 20-28, 2011 (Year: 2011).*

(Continued)

*Primary Examiner* — Dramos Kalapodas
(74) *Attorney, Agent, or Firm* — Fay Sharpe LLP

(57) ABSTRACT

A set of rough prediction modes including a MPM subset is determined for a code block during image encoding. A first prediction mode having a mode cost less than a first threshold is selected from the set of rough prediction modes, and a second prediction mode having a mode cost less than a second threshold is selected from the MPM subset. A candidate mode subset is determined based on mode types of prediction modes contained in the set of rough prediction modes and a ranking result of mode costs of the prediction modes, when the mode cost of the first prediction mode is different from the mode cost of the second prediction mode. A target prediction mode is determined for the code block from the candidate mode subset. The code block is encoded with the target prediction mode.

16 Claims, 4 Drawing Sheets

(51) Int. Cl.
  *H04N 19/159*   (2014.01)
  *H04N 19/176*   (2014.01)

(56) References Cited

U.S. PATENT DOCUMENTS

| | | | | |
|---|---|---|---|---|
| 2016/0127725 | A1* | 5/2016 | Jamali | H04N 19/147 |
| | | | | 375/240.12 |
| 2019/0230374 | A1* | 7/2019 | Yao | H04N 19/45 |
| 2020/0007862 | A1* | 1/2020 | Lin | H04N 19/70 |
| 2020/0404302 | A1* | 12/2020 | Heo | H04N 19/132 |
| 2021/0076028 | A1* | 3/2021 | Heo | H04N 19/159 |
| 2021/0266525 | A1* | 8/2021 | Tsukuba | H04N 19/147 |
| 2021/0368162 | A1* | 11/2021 | Heo | H04N 19/159 |

FOREIGN PATENT DOCUMENTS

| | | | | |
|---|---|---|---|---|
| CN | 104581152 A | * | 4/2015 | |
| CN | 104581152 A | | 4/2015 | |
| JP | 2018050195 A | | 3/2018 | |
| KR | 1516347 B1 | * | 5/2015 | ......... H04N 19/103 |
| KR | 1724212 B1 | * | 4/2017 | ......... H04N 19/107 |
| KR | 101724212 B1 | | 4/2017 | |

OTHER PUBLICATIONS

Extended European Search Report for Application No. 21182504.7, dated Dec. 7, 2021, 13 pages.

Kanayah Saurty et al., "A Modified Rough Mode Decision Process for Fast Hight Efficiency Video Coding (HEVC) Intra Prediction", Printed off the Internet, Apr. 29, 2015, 6 pages.

Andrzej Abramowski, "A survey over possible intra prediction optimizations in the H.265/HEVC encoder", Proc. of SPIE, vol. 10031, Sep. 28, 2016, 13 pages.

Moonmo Koo et al., "Description of SDR video coding technology proposal by LG Electronics", Joint Video Experts Team (JVET), 10th Meeting: San Diego, CA, Apr. 11, 2018, 71 pages.

Liang Zhao et al., "Further Encoder Improvement of intra mode decision", Joint Collaborative Team on Video Coding (JCT-VC), 4th Meeting: Daegu, KR, Jan. 22, 2011, 6 pages.

Po-Han Lin et al., "Restriction of fast intra-mode decision", Joint Video Exploration Team (JVET), 8th Meeting: Macao, China, Oct. 19, 2017, 2 pages.

Office Action for Japanese Application No. 2021-095871, dated Aug. 23, 2022, 4 pages.

Office Action for Chinese Application No. 202010620842.2, dated Oct. 19, 2022, 11 pages.

* cited by examiner

METHOD FOR IMAGE ENCODING, ELECTRONIC DEVICE AND STORAGE MEDIUM

CROSS REFERENCE TO RELATED APPLICATIONS

This application claims priority and benefits to Chinese Application No. 202010620842.2, filed on Jun. 30, 2020, the entire content of which is incorporated herein by reference.

TECHNICAL FIELD

The disclosure relates to the field of computer technologies, specifically to the fields of cloud computing and image processing technologies, and in particular to a method for image encoding, an apparatus for image encoding, an electronic device and a storage medium.

BACKGROUND

High Efficiency Video Encoding (HEVC) standard is a new video encoding and compression standard. Compared to H.264/AVC standard, nearly 50% of code rate of the same video with the same definition is saved based on the HEVC standard, which has a wide application prospect.

SUMMARY

A method for image encoding includes: determining a set of rough prediction modes for a code block during image encoding, in which the set of rough prediction modes includes a most probable mode (MPM) subset of the code block; selecting a first prediction mode from the set of rough prediction modes, and selecting a second prediction mode from the MPM subset, a mode cost of the first prediction mode being less than a first threshold, and a mode cost of the second prediction mode being less than a second threshold; determining a candidate mode subset based on mode types of prediction modes contained in the set of rough prediction modes and a ranking result of mode costs of prediction modes contained in the set of rough prediction modes, in a condition that the mode cost of the first prediction mode is different from the mode cost of the second prediction mode; determining a target prediction mode for the code block from the candidate mode subset; and encoding the code block with the target prediction mode.

An electronic device includes: at least one processor and a memory communicatively coupled to the at least one processor. The memory stores instructions executable by the at least one processor, and when the instructions are executed by the at least one processor, the at least one processor is configured to determine a set of rough prediction modes for a code block during image encoding, in which the set of rough prediction modes includes a most probable mode (MPM) subset of the code block; select a first prediction mode from the set of rough prediction modes, and select a second prediction mode from the MPM subset, a mode cost of the first prediction mode being less than a first threshold, and a mode cost of the second prediction mode being less than a second threshold; determine a candidate mode subset based on mode types of prediction modes contained in the set of rough prediction modes and a ranking result of mode costs of prediction modes contained in the set of rough prediction modes, in a condition that the mode cost of the first prediction mode is different from the mode cost of the second prediction mode; determine a target prediction mode for the code block from the candidate mode subset; and encode the code block with the target prediction mode.

A non-transitory computer-readable storage medium, has computer instructions stored thereon. The computer instructions are configured to cause a computer to execute the method for image encoding. The method includes determining a set of rough prediction modes for a code block during image encoding, in which the set of rough prediction modes includes a most probable mode (MPM) subset of the code block; selecting a first prediction mode from the set of rough prediction modes, and selecting a second prediction mode from the MPM subset, a mode cost of the first prediction mode being less than a first threshold, and a mode cost of the second prediction mode being less than a second threshold; determining a candidate mode subset based on mode types of prediction modes contained in the set of rough prediction modes and a ranking result of mode costs of prediction modes contained in the set of rough prediction modes, in a condition that the mode cost of the first prediction mode is different from the mode cost of the second prediction mode; determining a target prediction mode for the code block from the candidate mode subset; and encoding the code block with the target prediction mode.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

High Efficiency Video Encoding (HEVC) standard is a new video encoding and compression standard. Compared to H.264/AVC standard, nearly 50% of code rate of the same video with the same definition is saved based on the HEVC standard, which has a wide application prospect.

Based on H264 standard, video intra-frame prediction only includes 9 prediction modes. However, in the HEVC standard, there are 35 prediction modes, including 33 angle modes, 1 direct current mode (DC mode) and 1 planar mode, which enables the HEVC standard to achieve fine prediction granularity and high compression efficiency during video encoding. However, excessive intra-frame prediction modes greatly increase an amount of calculation for intra-frame encoding and make encoding efficiency low.

The disclosure provides a method and an apparatus for image encoding, a related electronic device, and a non-transitory computer readable storage medium.

Figure 1:
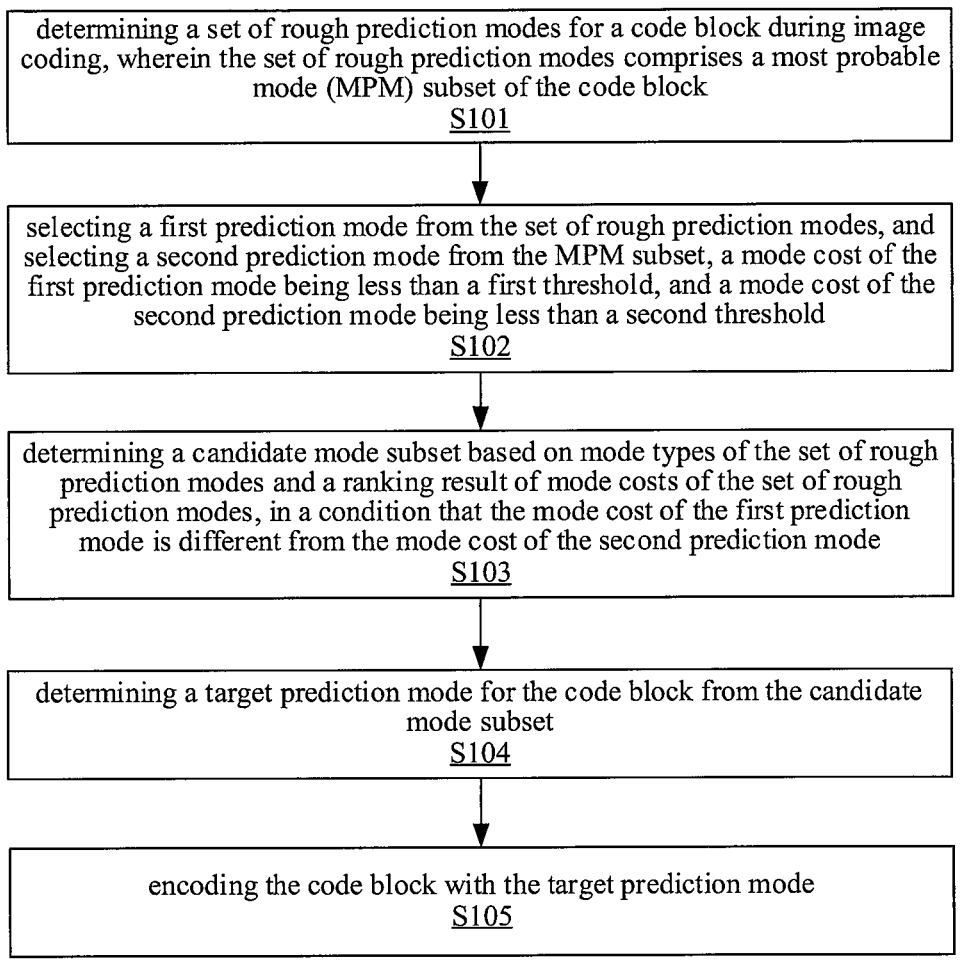
FIG. 1 is a flowchart illustrating a method for image encoding according to embodiments of the disclosure.

FIG. 1 is a flowchart illustrating a method for image encoding according to embodiments of the disclosure. The method is applicable for encoding an image, especially for intra-frame encoding of a video. For example, the HEVC standard may be used for the image encoding. The method according to the disclosure is executed by an apparatus for image encoding. The apparatus may be implemented by software and/or hardware and may be integrated into an electronic device with computing capability, such as a terminal or a server.

In the disclosure, the image to be encoded may be an image included in an image sequence, and specifically be a frame of a video to be encoded. Each image may be divided into code blocks based on a size of the image. The size of each code block may be flexibly set, which is not limited in the disclosure. Each code block may be performed with the same encoding process. In the disclosure, the method is applied on only one code block (e.g., a current code block) for easy description. For all other code blocks, the encoding processes are the same to the encoding process on the current code block.

As illustrated in FIG. 1, the method for image encoding according to embodiments of the disclosure may include the following.

At block S101, a set of rough prediction modes is determined for a current code block during image encoding. The set of rough prediction modes includes a most probable mode (MPM) subset of the current code block.

The set of rough prediction modes refer to a prediction mode set that is obtained through Rough Mode Decision (RMD), which is helpful to initially reduce the number of the prediction modes involved in encoding calculation in the process of determining the target prediction mode. The MPM subset is determined based on target prediction modes of one or more adjacent code blocks to the current code block. The adjacent code block may include at least one of an upper code block, a left code block, and an upper-left code block of the current code block. Generally, the MPM subset may include the target prediction modes of the upper code block and the left code block adjacent to the current code block, thereby increasing the accuracy of determining the target prediction mode for the current code block. Moreover, in the process of selecting the target prediction mode for the current code block, the one or more adjacent code blocks have already been encoded with corresponding target prediction modes.

In some examples, determining the set of rough prediction modes for the code block during the image encoding may include: determining at least one intra-frame prediction mode for the code block during the image encoding based on a target encoding standard; determining a mode subset from the at least one intra-frame prediction mode based on a respective mode cost of each intra-frame prediction mode; determining the MPM subset of the current code block based on the target prediction modes of one or more adjacent code blocks of the current code block; and determining the mode subset and the MPM subset as the set of rough prediction modes for the current code block.

In some examples, the intra-frame prediction modes provided by different encoding standards are different. For example, for the HEVC standard, 35 prediction modes may be provided. For the video encoding, the intra-frame prediction is to, based on space-domain correlation of the video, reduce time-domain redundancy of the video by predicting a current pixel with encoded pixels adjacent to the current pixel within a same frame.

In some examples, the mode cost is a measurement factor for preliminary filtering the intra-frame prediction modes, which may be SATD (sum of absolute transformed difference) cost (satd_cost). The satd_cost is a measurement for a residual signal of the video, which is a sum of absolute values of coefficients after performing Hadamard transformation on the residual signal. In detail, a preset number of intra-frame prediction modes whose mode costs are less than a cost threshold may be determined as the mode subset.

In some examples, the adjacent code block may include at least one of an upper code block, a left code block, and an upper left code block of the current code block.

At block S102, a first prediction mode whose mode cost is less than a first threshold is selected from the set of rough prediction modes, and a second prediction mode whose mode cost is less than a second threshold is selected from the MPM subset.

The first threshold and the second threshold may be flexibly set based on actual situations, which are not limited in the disclosure. The first threshold is set to select a prediction mode having a relatively low mode cost and meeting a current mode selection requirement from the set of rough prediction modes and the second threshold is set to select a prediction mode having a relatively low mode cost and meeting a current mode selection requirement from the MPM subset. In some examples, the first prediction mode refers to a prediction mode whose mode cost is the minimum among the set of rough prediction modes, and the second prediction mode may refer to a prediction mode whose mode cost is the minimum among the MPM subset. In addition, prediction modes included in the set of rough prediction modes may be ranked based on the mode costs to determine the first prediction mode, and prediction modes included in the MPM subset may be ranked based on the mode costs to determine the second prediction mode. Terms "first" and "second" do not have any restriction on the order, and only used to distinguish phrases.

At block S103, a candidate mode subset is determined based on mode types of the set of rough prediction modes and a ranking result of mode costs of the set of rough prediction modes, in a condition that the mode cost of the first prediction mode is different from the mode cost of the second prediction mode.

In detail, the mode cost of the first prediction mode being different from the mode cost of the second prediction mode means that the prediction mode having a relatively low mode cost and meeting the current mode selection requirement in the set of rough prediction modes is different from the prediction mode having a relatively low mode cost and meeting the current mode selection requirement in the MPM subset. For example, the prediction mode having the minimum mode cost in the set of rough prediction modes is different from the prediction mode having the minimum mode cost in the MPM subset. In this case, the candidate mode subset is determined from the set of rough prediction modes based on the ranking result of mode costs of prediction modes in the set of rough prediction modes and the mode types of prediction modes in the set of rough prediction modes. For example, the candidate mode subset may be constituted by prediction modes with relatively low mode costs and corresponding to a direct-current (DC) mode or a planar mode. The number of prediction modes in the candidate mode subset may be set adaptively. For example, in order to effectively control the calculation amount of the image encoding, the number of prediction modes contained in the candidate mode subset may be set to be no more than 4.

In some examples, the method according to the disclosure may further include: determining the MPM subset as the candidate mode subset, in a condition that the mode cost of the first prediction mode is the same with the mode cost of the second prediction mode. The mode cost of the first prediction mode being the same with the mode cost of the second prediction mode means that the prediction mode that has a relatively low mode cost and meets the current mode selection requirement from the set of rough prediction modes is the same with the prediction mode that has a relatively low mode cost and meets the current mode selection requirement from the MPM subset. For example, the prediction mode having the minimum mode cost from the set of rough prediction set is the same with the prediction mode having the minimum mode cost from the MPM subset. In this case, the MPM subset can be directly used as the candidate mode subset to determine a target prediction mode for the current code block. According to a statistical rule, a probability of determining a prediction mode contained in the MPM subset as an optimal prediction mode of the current code block is high. Therefore, when the mode cost of the first prediction mode is the same with the mode cost of the second prediction mode, the target prediction mode of the current code block may be directly determined from the MPM subset. As a result, the number of the prediction modes involved in encoding calculation in the process of determining the target prediction mode may be effectively reduced, the calculation amount may be reduced, and encoding efficiency may be improved.

At block S104, the target prediction mode of the current code block is determined from the candidate mode subset.

After the candidate mode subset is determined, the target prediction mode may be obtained based on a more accurate mode selection condition. The mode selection condition may be determined based on prediction mode measurement factors and mode selection requirements in the image encoding field. For example, the mode selection condition may be that the mode selection is based on a RDO (rate distortion optimized) cost (rdo_cost) of the prediction modes. The RDO is a cost function scheme proposed based on the rate-distortion theory. The main idea of the RDO is that when calculating the cost function, both the code rate constraint and the distortion constraint are considered to achieve low distortion as well as low code rate, which is more conducive to the transmission of image sequences or video streams. Therefore, based on the rdo_cost, the accuracy of the target prediction mode determined from the candidate mode subset can be increased, and an ideal encoding result can be achieved.

For example, determining the target prediction mode for the current code block from the candidate mode subset may include calculating a respective RDO cost of each prediction mode in the candidate mode subset; and determining the target prediction mode for the current code block from the candidate mode subset based on the respective RDO cost. For example, the prediction mode with the minimum RDO cost can be determined as the target prediction mode.

Regarding the calculation of the RDO cost, reference may be made to existing calculation methods, which is not limited in the disclosure.

It is to be noted that the process of determining the target prediction mode from the candidate mode subset generally requires a large amount of calculation in the encoding process. For example, the calculation process of the RDO cost is complicated. In the disclosure, a reasonable selection logic may be set for candidate mode subset to ensure rationality of the number of prediction modes contained in the candidate mode subset, thereby significantly reducing the number of the prediction modes involved in subsequent encoding calculations and effectively reducing the amount of encoding calculations.

At block S105, the current code block is encoded with the target prediction mode.

After the target prediction mode of the current code block is determined, existing methods may be used to encode the current code block with the target prediction mode.

With the disclosure, the first prediction mode having the mode cost less than the first threshold is selected from the set of rough prediction modes, and the second prediction mode having the mode cost less than the second threshold is selected from the MPM subset. It is determined whether the mode cost of the first prediction mode is the same with the mode cost of the second prediction mode. The candidate mode subset is determined based on the mode types of the prediction modes in the set of rough prediction modes and the ranking result of mode costs of the prediction modes in of the set of rough prediction modes, in a condition that the mode cost of the first prediction mode is different from the mode cost of the second prediction mode. The target prediction mode of the current code block is determined from the candidate mode subset and used to encode the current code block. The selection of the encoding prediction mode in the image encoding process is optimized. A new mode selection logic is provided to effectively reduce the number of the prediction modes involved in encoding calculations in the process of determining the target prediction mode, reduce the calculation amount for the image encoding, reduce occupation of computing resources in the image encoding process, improve encoding efficiency, and solve a problem of low encoding efficiency due to the large number of the prediction modes involved in encoding calculations in the existing methods.

Figure 2:
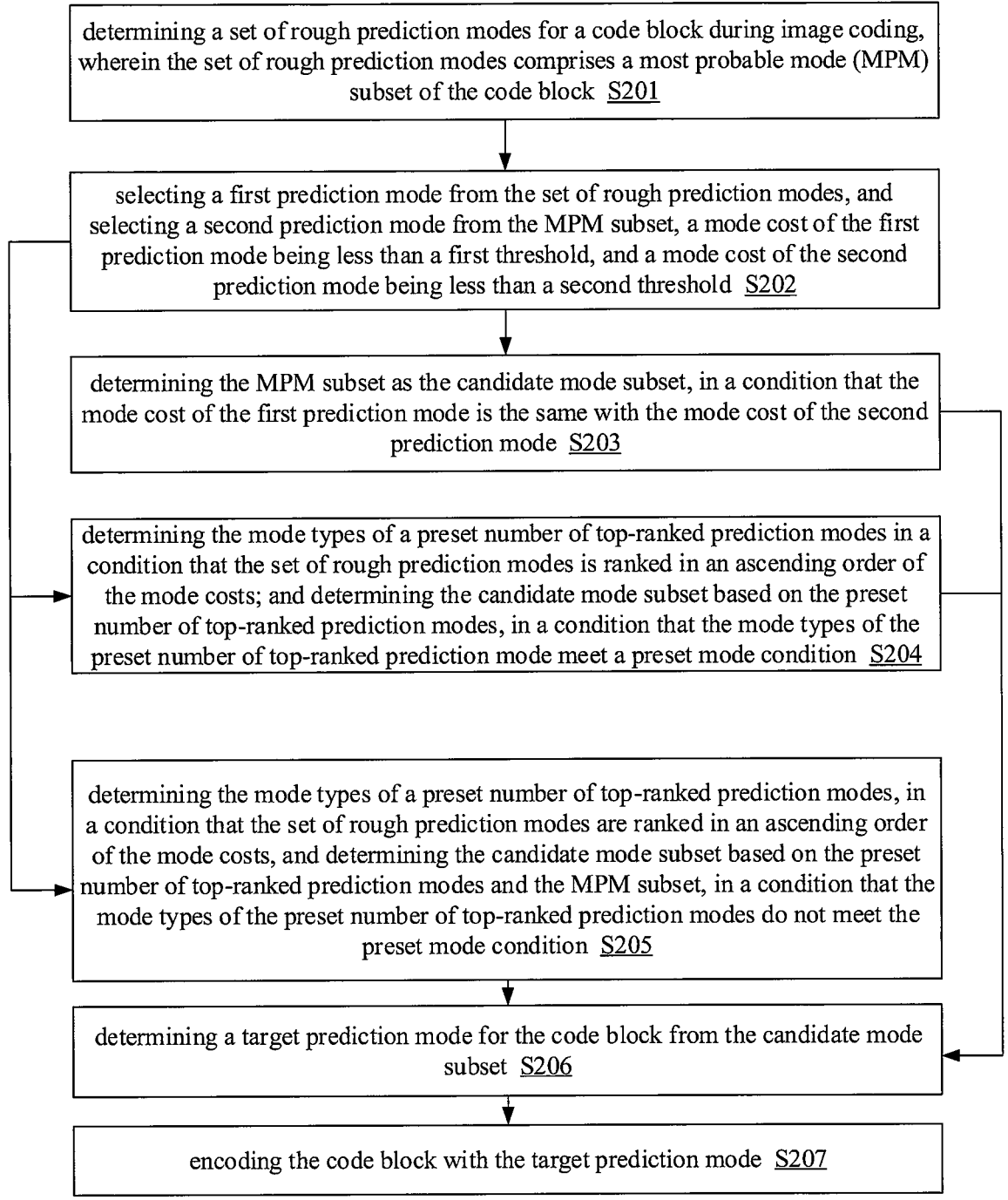
FIG. 2 is a flowchart illustrating a method for image encoding according to embodiments of the disclosure.

FIG. 2 is a flowchart illustrating a method for image encoding according to embodiments of the disclosure. FIG. 2 is an optimization and expansion based on the above technical solution and can be combined with the above implementations. As illustrated in FIG. 2, the method may include the following.

At block S201, a set of rough prediction modes is determined for a current code block during image encoding. The set of rough prediction modes includes a most probable mode (MPM) subset of the current code block.

At block S202, a first prediction mode whose mode cost is less than a first threshold is selected from the set of rough prediction modes, and a second prediction mode whose mode cost is less than a second threshold is selected from the MPM subset.

At block S203, the MPM subset is determined as the candidate mode subset, in a condition that the mode cost of the first prediction mode is the same with the mode cost of the second prediction mode.

According to the statistical rule, a probability of determining a prediction mode contained in the MPM subset as an optimal prediction mode for the current code block is high. Therefore, when the mode cost of the first prediction mode is the same with the mode cost of the second prediction mode, the target prediction mode of the current code block can be directly determined from the MPM subset, thereby effectively reducing the number of the prediction modes involved in encoding calculation in the process of determining the target prediction mode, reducing the calculation amount, and improving the encoding efficiency.

At block S204, mode types of a preset number of top-ranked prediction modes are determined when the prediction modes in the set of rough prediction modes are ranked in an ascending order of the mode costs, and the candidate mode subset is determined based on the preset number of top-ranked prediction modes, when the mode cost of the first prediction mode is different from the mode cost of the second prediction mode, and the mode types of the preset number of top-ranked prediction mode meet a preset mode condition.

The preset mode condition includes that the mode types of the top two prediction modes are both an angle mode, and the mode type of at least one of remaining prediction modes is a direct-current mode (DC mode) or a planar mode. The value of the preset number may be set based on a mode selection requirement.

When the prediction modes contained in the set of rough prediction modes are ranked in the ascending order of the mode costs, and the mode types of the preset number of top-ranked prediction modes meet the preset mode condition, the candidate mode subset may be constituted by the preset number of top-ranked prediction modes, or the candidate mode subset is constituted by the top two prediction modes both corresponding to the angle mode, as well as at least one prediction mode corresponding to only the DC mode, only the planar mode, or both the DC mode and the planar mode. Further, if the preset number of prediction modes all correspond to a first mode of the DC mode and the planar mode, prediction modes corresponding to a second mode of the DC mode and the planar mode are determined from the remaining prediction modes of the set of rough prediction modes. The candidate mode subset may be constituted by the top two prediction modes both corresponding to the one mode, the prediction modes that are contained in preset number of top-ranked prediction modes and all correspond to the first mode, and the prediction modes that are contained in the remaining prediction modes and all correspond to the second mode. In other words, determining the candidate mode subset based on the preset number of top-ranked prediction modes includes: constituting the candidate mode subset by the top two prediction modes and at least one prediction mode from the set of rough prediction modes, where the at least one prediction mode corresponds to only the DC mode, only the planar mode, or both the DC mode and the planar mode. For example, the candidate mode subset may include 4 prediction modes, i.e., the top two prediction modes both corresponding to the angle mode, a prediction mode corresponding to the DC mode, and a prediction mode corresponding to the planar mode. In the disclosure, in order to effectively control the number of prediction modes contained in the candidate mode subset, the preset number may be set to 4.

Reasonable control of the number of the prediction modes contained in the candidate mode subset may help to reduce the number of the prediction modes involved in subsequent encoding calculations and reduce the calculation amount, as well as avoid the number of subsequent prediction modes involved in encoding calculations being too small to decrease the accuracy of determining the target prediction mode.

In the disclosure, considering that the DC mode and the planar mode can well reflect whether the current code block belongs to a flat area, if the mode costs of the DC mode and the planar mode are relatively low (for example, the SATD cost is low), it can be considered that the encoding result obtained by encoding the current code block with the DC mode and the planar mode is ideal, and thus the prediction modes corresponding to the DC mode and the planar mode are determined as the prediction modes of the candidate mode subset.

At block S205, when the mode cost of the first prediction mode is different from the mode cost of the second prediction mode, the prediction modes in the set of rough prediction set are ranked in an ascending order of mode cost, and the mode types of a preset number of top-ranked prediction modes do not meet the preset mode condition, the candidate mode subset is determined based on the preset number of top-ranked prediction modes and the MPM subset.

In other words, when any condition branch of the preset mode condition is not met, in the process of determining the candidate mode subset, it is necessary to comprehensively consider whether the preset number of top-ranked prediction modes include a prediction mode of the MPM subset, to ensure rationality of determining the candidate mode subset. In detail, the candidate mode subset may be constituted by the preset number of top-ranked prediction modes and the MPM subset directly. For example, the candidate mode subset can be constituted by the top two or the top three prediction modes and the MPM subset.

At block S206, a target prediction mode of the current code block is determined from the candidate mode subset.

At block S207, the current code block is coded with the target prediction mode.

With the disclosure, the first prediction mode whose mode cost is less than the first threshold is selected from the set of rough prediction modes, and the second prediction mode whose mode cost is less than the second threshold is selected from the MPM subset. It is determined whether the mode cost of the first prediction mode is the same with the mode cost of the second prediction mode. The candidate mode subset is determined based on the determination result. It is determined whether the mode types of the preset number of top-ranked prediction modes meet the preset mode condition, when the prediction modes contained in the set of rough prediction set are ranked in the ascending order of mode cost, and the mode cost of the first prediction mode is different from the mode cost of the second prediction mode. That is, in the disclosure, there is provided a new mode selection logic, which realizes the effect of reasonably determining the candidate mode subset based on different situations, effectively control the number of prediction modes contained in the candidate mode subset, effectively reduce the number of the prediction modes involved in encoding calculations in the process of determining the target prediction mode, reduce the calculation amount for the image encoding, reduce the occupation of computing resources in the image encoding process, improve the encoding efficiency, and solve the problem of low encoding efficiency due to the large number of prediction modes involved in encoding calculations in existing methods.

Based on the above technical solution, when the prediction modes in the set of rough prediction modes are ranked in the ascending order of mode cost and the mode type of the preset number of top-ranked prediction modes do not meet the preset mode condition, determining the candidate mode subset based on the preset number of top-ranked prediction modes and the MPM subset includes: determining the candidate mode subset based on top N prediction modes of the preset number of top-ranked prediction modes and the MPM subset, in a condition that the mode types of the top two prediction modes are both the angle mode, and the mode types of remaining prediction modes are neither the DC mode nor the planar mode, N being an integer less than or equal to the preset number; or determining the candidate mode subset based on top M prediction modes of the preset number of top-ranked prediction modes and the MPM subset, in a condition that the mode type of one of top two prediction modes is the angle mode, and the mode type of the other prediction mode is the DC mode or the planar mode, M being an integer less than or equal to the preset number; or determining the candidate mode subset based on top L prediction modes of the preset number of top-ranked prediction modes and the MPM subset, in a condition that the mode types of the top two prediction modes are both the DC mode, both the planar mode, or the DC mode and the planar mode, L being an integer less than or equal to the preset number.

In some examples, N, M and L may be the same or different. For example, L, corresponding to the case that the mode types of the top two prediction modes are both the DC mode, both the planar mode, or the DC mode and the planar mode, is less than N corresponding to the case that the mode types of the top two prediction modes are both the angle mode, and the mode types of remaining prediction modes are neither the DC mode nor the planar mode, or less than M corresponding to the case that the mode type of one of top two prediction modes is the angle mode, and the mode type of the other prediction mode is the DC mode or the planar mode, which may reduce the number of the prediction modes contained in the candidate mode subset. For example, L may be 2, which means that the top two prediction modes corresponding to the DC mode and the planar mode and the MPM subset are considered; and N may be 3, which means that the top 3 prediction modes and the MPM subset are considered, to reasonably control the number of the prediction modes contained in the candidate mode subset.

Determining the candidate mode subset based on the top N, the top M or the top L prediction modes of the preset number of top-ranked prediction modes and the MPM subset includes: determining repeated modes between the top N, the top M or the top L prediction modes and the MPM subset; removing the repeated modes from the top N, the top M or the top L prediction modes and the MPM subset, and constituting the candidate mode subset by using remaining prediction modes.

By removing the repeated prediction modes, it is possible to reduce repeated encoding calculations and save computing resources in the process of determining the target prediction mode, which helps to improve encoding efficiency.

Figure 3:
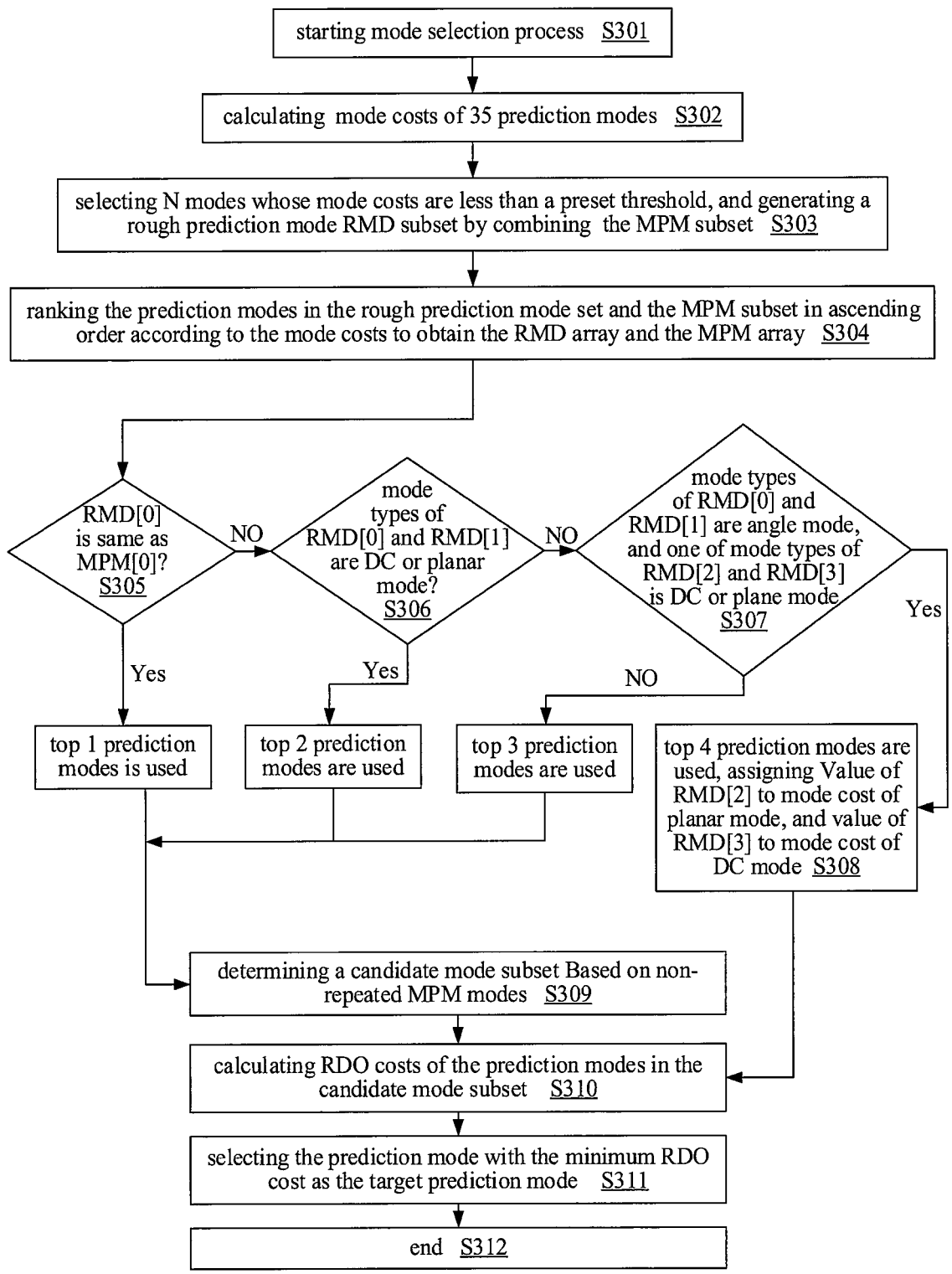
FIG. 3 is a flowchart illustrating a method for selecting a target prediction mode according to embodiments of the disclosure.

FIG. 3 is a flowchart illustrating a method for selecting a target prediction mode according to embodiments of the disclosure. The disclosure provides descriptions by taking the HEVC standard as an example, which should not be understood as a limitation to the disclosure. As illustrated in FIG. 3, the method for selecting a target prediction mode may include the following.

At block S301, a mode selection process is started.

At block S302, the mode costs of 35 prediction modes are calculated.

The mode cost refers to the SATD cost.

At block S303, a number of prediction modes are selected, where the mode costs of the selected prediction modes are less than a preset threshold. A set of rough prediction modes (RMD set) is constituted by the N prediction modes as well as the MPM subset.

The preset threshold is set adaptively, which is not limited in the disclosure. Any number of prediction modes can be selected. In some examples, the MPM subset may include a target prediction mode of an upper code block and a target prediction mode of a left code block adjacent to the current code block. In this case, the MPM subset includes no more than 2 prediction modes.

At block S304, the prediction modes in the set of rough prediction modes and the MPM subset are ranked respectively in an ascending order of mode cost to obtain a RMD array and a MPM array.

In detail, the RMD array may be expressed as RMD[ ], and the MPM array may be expressed as MPM[ ]. Each element of the array corresponds to a mode cost.

At block S305, it is determined whether RMD[0] is the same with MPM[0].

In other words, it is determined whether the minimum mode cost of the set of rough prediction modes is the same with the minimum mode cost of the MPM subset. When the minimum mode cost of the set of rough prediction modes is the same with the minimum mode cost of the MPM subset, the block S309 is executed. When the minimum mode cost of the set of rough prediction modes is different from the minimum mode cost of the MPM subset, the S306 is executed.

At block S306, it is determined if the mode type of RMD[0] and the mode type of RMD[1] are both the DC mode, both the planar mode, or respectively the DC mode and the planar mode.

In other words, it is determined if the top two prediction modes belong to the DC mode or the planar mode based on the ascending result of the mode costs of the prediction modes included in the set of rough prediction modes. If the mode types of the top two prediction modes only include the DC mode or the planar mode, the block S309 is executed. If at least one of the mode types of the top two prediction modes is the angel mode, the block S307 is executed.

At block S307, it is determined if the mode type of RMD[0] and the mode type of RMD[1] are both the angle mode, and if the mode type of RMD[2] and the mode type of RMD[3] are both the DC mode, both the planar mode, or respectively the DC mode and the planar mode.

When the mode types of the top two prediction modes in the set of rough prediction modes are both the angel mode when the prediction modes contained in the set of rough prediction modes are ranked in the ascending order of mode cost, and when at least one of the mode type of the third-placed prediction mode and the mode type of the fourth-placed prediction mode is the DC mode or the planar mode, the block S308 is executed.

When the prediction modes contained in the set of rough prediction modes are ranked in the ascending order of mode cost, and one of the mode types of the top two prediction modes in the set of rough prediction modes is the angle mode, while the other is the DC mode or the planar mode, the block S309 is executed. When the prediction modes contained in the set of rough prediction modes are ranked in the ascending order of mode cost, the mode types of the top two prediction modes are both the angle mode, and neither the mode type of the third-placed prediction mode nor the mode type of the fourth-placed prediction mode is the DC mode or the planar mode, the block S309 is executed.

At block S308, the top 4 prediction modes are used to form the candidate mode subset, a value of RMD[2] is assigned to the mode cost corresponding to the planar mode, and a value of RMD[3] is assigned to the mode cost corresponding to the DC mode.

There is a correspondence between the elements of the array and the prediction modes. Therefore, forcedly assignment values to mode costs may ensure that the planar mode and the DC mode are placed at top 4 of the ranking result. The prediction mode corresponding to RMD[0] and the prediction mode corresponding to RMD[1] before the forced assignment, and the prediction mode corresponding to RMD[2] and the prediction mode corresponding to RMD[3] after the forced assignment are determined as prediction modes of the candidate mode subset. The number of the prediction modes included in the candidate mode subset is 4.

In the disclosure, considering that the DC mode and the planar mode may well reflect whether the current code block belongs to a flat area, if the mode cost of the DC mode and the mode cost of the planar mode are relatively low (for example, the SATD cost is low), it can be considered that the encoding result obtained by encoding the current code block with the DC mode and the planar mode is ideal, and thus the DC mode and the planar mode are determined as the prediction modes of the candidate mode subset.

At block S309, the candidate mode subset is determined based on non-repeated MPM modes.

In a case that the block S309 is executed directly after the block S305, the top 1 prediction mode is used to form the candidate mode subset (i.e., the prediction mode with the minimum mode cost in the MPM subset is used as a prediction mode of the candidate mode subset), and it is determined whether the MPM subset includes a mode that is different from the prediction mode having the lowest mode cost. In a case that the MPM subset includes the mode that is different from the prediction mode having the lowest mode cost, this mode is determined as a prediction mode of the candidate mode subset. That is, the MPM subset is the candidate mode subset.

In a case that the block S309 is executed directly after the block S306, the top 2 prediction modes are used to form the candidate mode subset, the DC mode and/or the planar mode corresponding to RMD[0] and RMD[1] may be the prediction modes of the candidate mode subset, and the candidate mode subset may be constituted by these two prediction modes as well as a mode that is different from either the DC mode or the planar mode and is contained in the MPM subset. In this case, the number of prediction modes included in the candidate mode subset is no more than 4.

In a case that the block S309 is executed directly after the S307, the top 3 prediction modes are used to form the candidate mode subset, the prediction modes corresponding to RMD[0], RMD[1] and RMD[2] may be prediction modes of the candidate mode subset, and the candidate mode subset may be constituted by these three modes and a mode that is different from these three modes and is contained in the MPM subset. In this case, the number of the prediction modes included in the candidate mode subset is no more than 5.

At block S310, the RDO costs of the prediction modes contained in the candidate mode subset are calculated respectively.

At block S311, a prediction mode having the minimum RDO cost is selected as the target prediction mode.

At block S312, the process is ended.

With the disclosure, the selection of the encoding prediction modes during the image encoding process is optimized, redundant calculation of the RDO costs when the intra-frame prediction mode is selected in the HEVC encoder is saved, and the encoding efficiency is improved.

Figure 4:
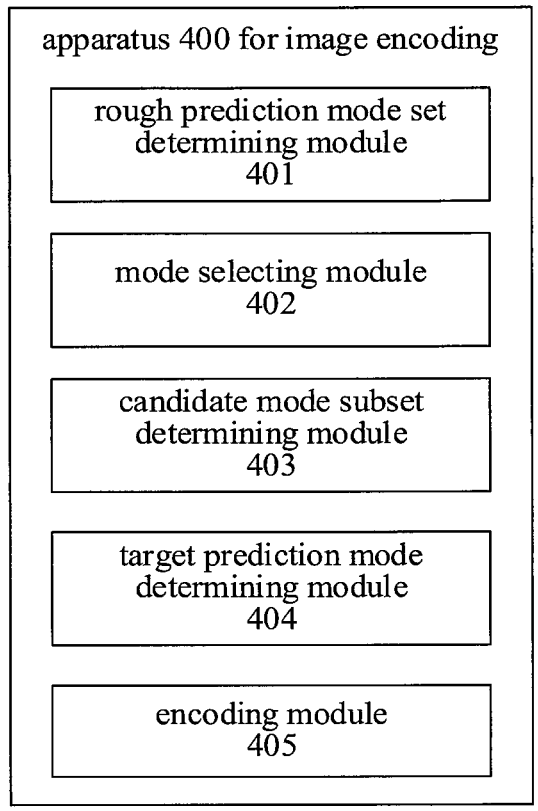
FIG. 4 is a schematic diagram illustrating an apparatus for image encoding according to embodiments of the disclosure.

FIG. 4 is a schematic diagram of another image encoding apparatus according to embodiments of the disclosure. The embodiments of the disclosure are applied for encoding images. The apparatus is implemented by software and/or hardware, and is integrated on any electronic device with computing capabilities, such as a terminal and a server.

As illustrated in FIG. 4, the apparatus 400 for image encoding according to embodiments of the disclosure may include a rough prediction mode set determining module 401, a mode selecting module 402, a candidate mode subset determining module 403, a target prediction mode determining module 404 and an encoding module 405.

The rough prediction mode set determining module 401 is configured to determine a set of rough prediction modes for a code block during image encoding, in which the set of rough prediction modes comprises a most probable mode (MPM) subset of the code block.

The mode selecting module 402 is configured to select a first prediction mode from the set of rough prediction modes, and select a second prediction mode from the MPM subset, a mode cost of the first prediction mode being less than a first threshold, and a mode cost of the second prediction mode being less than a second threshold.

The candidate mode subset determining module 403 is configured to determine a candidate mode subset based on mode types of the set of rough prediction modes and a ranking result of mode costs of the set of rough prediction modes, in a condition that the mode cost of the first prediction mode is different from the mode cost of the second prediction mode.

The target prediction mode determining module 404 is configured to determine a target prediction mode for the code block from the candidate mode subset.

The encoding module 405 is configured to code the code block with the target prediction mode.

Optionally, the candidate mode subset determining module 403 is further configured to: determine the MPM subset as the candidate mode subset, in a condition that the mode cost of the first prediction mode is the same with the mode cost of the second prediction mode.

Optionally, the candidate mode subset determining module 403 further includes a first subset determining unit. The first subset determining unit is configured to determine the mode types of a preset number of top-ranked prediction modes in a condition that the set of rough prediction modes is ranked in an ascending order of the mode costs, and to determine the candidate mode subset based on the preset number of top-ranked prediction modes, in a condition that the mode types of the preset number of top-ranked prediction mode meet a preset mode condition.

The preset mode condition is that the mode types of top two prediction modes are both an angle mode, and the mode type of at least one of remaining prediction modes is a direct current mode (DC mode) or a planar mode.

Optionally, the first subset determining unit is configured to constitute the candidate mode subset by the top two prediction modes and at least one prediction mode from the set of rough prediction modes, in which the mode type of the at least one prediction mode includes the DC mode, the planar mode, or both the DC mode and the planar mode.

Optionally, the candidate mode subset determining module 403 includes a second subset determining unit. The second subset determining unit is configured to determine the mode types of a preset number of top-ranked prediction modes, in a condition that the set of rough prediction modes are ranked in an ascending order of the mode costs, and to determine the candidate mode subset based on the preset number of top-ranked prediction modes and the MPM subset, in a condition that the mode types of the preset number of top-ranked prediction modes do not meet the preset mode condition.

Optionally, the second subset determining unit is configured to: determine the candidate mode subset based on top N prediction modes of the preset number of top-ranked prediction modes and the MPM subset, in a condition that the mode types of top two prediction modes are both the angle mode, and the mode types of remaining prediction modes are neither the DC mode nor the planar mode, N being an integer less than or equal to the preset number; or determine the candidate mode subset based on top M prediction modes of the preset number of top-ranked prediction modes and the MPM subset, in a condition that the mode type of one of top two prediction modes is the angle mode, and the mode type of the other is the DC mode or the planar mode, M being an integer less than or equal to the preset number; or determine the candidate mode subset based on top L prediction modes of the preset number of top-ranked prediction modes and the MPM subset, in a condition that the mode types of top two prediction modes are both the DC mode, both the planar mode, or the DC mode and the planar mode, L being an integer less than or equal to the preset number.

Optionally, the second subset determining unit is configured to: a repeated mode determining subunit and a repeated mode removing subunit. The repeated mode determining subunit is configured to determine repeated modes between the top N, M or L prediction modes and the MPM subset. The repeated mode removing subunit is configured to remove the repeated modes from the top N, M or L prediction modes and the MPM subset, and to constitute the candidate mode subset by using remaining prediction modes.

Optionally, L is less than N, or L is less than M.

Optionally, the target prediction mode determining module 404 includes: a rate distortion optimized cost determining unit and a target prediction mode determining unit. The rate distortion optimized cost determining unit is configured to determine a respective rate distortion optimized cost, RDO cost, of each prediction mode in the candidate mode subset. The target prediction mode determining unit is configured to determine the target prediction mode for the code block from the candidate mode subset based on the respective RDO cost.

Optionally, the rough prediction mode set determining module 401 includes: an intra-frame prediction mode determining unit, a candidate mode subset determining unit, a MPM subset determining unit and a rough prediction mode set determining unit. The intra-frame prediction mode determining unit is configured to determine at least one intra-frame prediction mode for the code block during the image encoding based on a target encoding standard. The candidate mode subset determining unit is configured to calculate a respective mode cost of each intra-frame prediction mode and to determine a mode subset from the at least one intra-frame prediction mode based on the respective mode cost. The MPM subset determining unit is configured to determine the MPM subset of the code block based on target prediction modes of code blocks adjacent to the code block. The rough prediction mode set determining unit is configured to determine the mode subset and the MPM subset as the set of rough prediction modes for the code block.

Optionally, the MPM subset includes target prediction modes of an upper code block and a left code block adjacent to the code block.

The apparatus 400 for image encoding according to the embodiments of the disclosure executes any method for image encoding according to the embodiments of the disclosure, and has functional modules and beneficial effects corresponding to the execution method. For content that is not described in detail in the apparatus embodiments of the disclosure, reference may be made to the description in any method embodiments of the disclosure.

According to the embodiments of the disclosure, the embodiments of the disclosure provide an electronic device and a readable storage medium.

Figure 5:
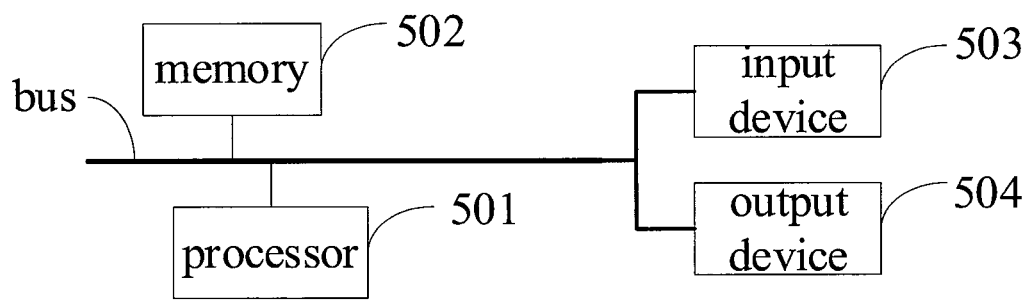
FIG. 5 is a block diagram illustrating an electronic device according to embodiments of the disclosure.

FIG. 5 is a block diagram of an electronic device used to implement a method for image encoding according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 502 is configured to store non-transitory software programs, non-transitory computer executable programs and modules, such as program instructions/modules (for example, the rough prediction mode set determining module 401, the mode selecting module 402, the candidate mode subset determining module 403, the target prediction mode determining module 404 and the encoding module 405 shown in FIG. 4) corresponding to the method in the embodiments of the disclosure. The processor 501 executes various functional applications and data processing of the electronic device by running non-transitory software programs, instructions, and modules stored in the memory 502, that is, implementing the method in the foregoing method embodiments.

The memory 502 may include a storage program area and a storage data area, where the storage program area may store an operating system and application programs required for at least one function. The storage data area may store data created according to the use of the electronic device for implementing the method. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device for implementing the method through a network. Examples of the above network include, but are not limited to, the Internet, an intranet, a local area network, a mobile communication network, and combinations thereof.

The electronic device used to implement the method for image encoding may further include: an input device 503 and an output device 504. The processor 501, the memory 502, the input device 503, and the output device 504 may be connected through a bus or in other manners. In FIG. 5, the connection through the bus is taken as an example.

The input device 503 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and block-chain network.

The computer system may include a client and a server. The client and server are generally remote from each other and interacting through a communication network. The client-server relation is generated by computer programs running on the respective computers and having a client-server relation with each other.

According to the technical solution of the disclosure, the first prediction mode is selected from the set of rough prediction modes, and the second prediction mode is selected from the MPM subset, the mode cost of the first prediction mode is less than the first threshold, and the mode cost of the second prediction mode is less than the second threshold. It is determined whether the mode cost of the first prediction mode is the same with the mode cost of the second prediction mode. The candidate mode subset is determined based on the mode types of the set of rough prediction modes and the ranking result of mode costs of the set of rough prediction modes, in a condition that the mode cost of the first prediction mode is different from the mode cost of the second prediction mode. The target prediction mode for the code block is determined from the candidate mode subset, and the code block is coded with the target prediction mode. The selection of the encoding prediction modes in the image encoding process is optimized, the calculation amount of image encoding is reduced, and the encoding efficiency is improved.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for image encoding, comprising:
   determining a set of rough prediction modes for a code block during image encoding, wherein the set of rough prediction modes comprises a most probable mode (MPM) subset of the code block;
   selecting a first prediction mode from the set of rough prediction modes, and selecting a second prediction mode from the MPM subset, a mode cost of the first prediction mode being less than a first threshold, and a mode cost of the second prediction mode being less than a second threshold;
   determining a candidate mode subset based on mode types of prediction modes contained in the set of rough prediction modes and a ranking result of mode costs of prediction modes contained in the set of rough prediction modes, in response to determining that the mode cost of the first prediction mode is different from the mode cost of the second prediction mode;
   determining a target prediction mode for the code block from the candidate mode subset; and
   encoding the code block with the target prediction mode;
   wherein determining the candidate mode subset based on the mode types of the prediction modes and the ranking result of mode costs of the prediction modes comprises:
   determining the mode types of a preset number of top-ranked prediction modes, wherein the prediction modes contained in the set of rough prediction modes are ranked in an ascending order of the mode costs, and
   determining the candidate mode subset based on top N prediction modes of the preset number of top-ranked prediction modes and the MPM subset, in response to determining that the mode types of top two prediction modes are both the angle mode, and the mode types of remaining prediction modes are neither the DC mode nor the planar mode, N being an integer less than or equal to the preset number; or
   determining the candidate mode subset based on top M prediction modes of the preset number of top-ranked prediction modes and the MPM subset, in response to determining that the mode type of one of top two prediction modes is the angle mode, and the mode type of the other is the DC mode or the planar mode, M being an integer less than or equal to the preset number; or
   determining the candidate mode subset based on top L prediction modes of the preset number of top-ranked prediction modes and the MPM subset, in response to determining that the mode types of top two prediction modes are both the DC mode, both the planar mode, or the DC mode and the planar mode, L being an integer less than or equal to the preset number.

2. The method according to claim 1, further comprising:
   determining the MPM subset as the candidate mode subset, in response to determining that the mode cost of the first prediction mode is the same as the mode cost of the second prediction mode.

3. The method according to claim 1, wherein determining the candidate mode subset based on the mode types of the prediction modes and the ranking result of mode costs of the prediction modes comprises:
   determining the mode types of a preset number of top-ranked prediction modes, wherein the prediction modes contained in the set of rough prediction modes are ranked in an ascending order of the mode costs; and
   determining the candidate mode subset based on the preset number of top-ranked prediction modes, in response to determining that the mode types of the preset number of top-ranked prediction mode meet a preset mode condition;
   the preset mode condition comprising that: the mode types of top two prediction modes are both an angle mode, and the mode type of at least one of remaining prediction modes is a direct current mode (DC mode) or a planar mode.

4. The method according to claim 3, wherein determining the candidate mode subset based on the preset number of top-ranked prediction modes comprises:
   constituting the candidate mode subset by the top two prediction modes and at least one prediction mode from the set of rough prediction modes, wherein the at least one prediction mode corresponds to the DC mode, the planar mode, or both the DC mode and the planar mode.

5. The method according to claim 1, wherein determining the candidate mode subset based on the top N, M or L prediction modes of the preset number of top-ranked prediction modes and the MPM subset, comprises:
   determining repeated modes between the top N, M or L prediction modes and the MPM subset; and
   removing the repeated modes from the top N, M or L prediction modes and/or the MPM subset, and constituting the candidate mode subset by using remaining prediction modes.

6. The method according to claim 1, wherein L is less than N, or L is less than M.

7. The method according to claim 1, wherein determining the target prediction mode for the code block from the candidate mode subset comprises:
   determining a respective rate distortion optimized cost, RDO cost, of each prediction mode in the candidate mode subset; and
   determining the target prediction mode for the code block from the candidate mode subset based on the respective RDO cost.

8. The method according to claim 1, wherein determining the set of rough prediction modes for the code block during the image encoding comprises:
   determining at least one intra-frame prediction mode for the code block during the image encoding based on a target encoding standard;
   calculating a respective mode cost of each intra-frame prediction mode and determining a mode subset from the at least one intra-frame prediction mode based on the respective mode cost;
   determining the MPM subset of the code block based on target prediction modes of code blocks adjacent to the code block; and
   determining the mode subset and the MPM subset as the set of rough prediction modes for the code block.

9. The method according to claim 1, wherein the MPM subset comprises respective target prediction modes of an upper code block and a left code block adjacent to the code block.

10. An electronic device, comprising:
    at least one processor; and
    a memory communicatively coupled to the at least one processor; wherein, the memory is configured to store instructions executable by the at least one processor, and when the instructions are executed by the at least one processor, the at least one processor is configured to:
determine a set of rough prediction modes for a code block during image encoding, wherein the set of rough prediction modes comprises a most probable mode (MPM) subset of the code block;
select a first prediction mode from the set of rough prediction modes, and select a second prediction mode from the MPM subset, a mode cost of the first prediction mode being less than a first threshold, and a mode cost of the second prediction mode being less than a second threshold;
determine a candidate mode subset based on mode types of prediction modes contained in the set of rough prediction modes and a ranking result of mode costs of prediction modes contained in the set of rough prediction modes, in response to determining that the mode cost of the first prediction mode is different from the mode cost of the second prediction mode;
determine a target prediction mode for the code block from the candidate mode subset; and
encode the code block with the target prediction mode;
wherein the processor is configured to determine the candidate mode subset based on the mode types of the prediction modes and the ranking result of mode costs of the prediction modes by:
determining the mode types of a preset number of top-ranked prediction modes, wherein the prediction modes contained in the set of rough prediction modes are ranked in an ascending order of the mode costs, and
determining the candidate mode subset based on top N prediction modes of the preset number of top-ranked prediction modes and the MPM subset, in response to determining that the mode types of top two prediction modes are both the angle mode, and the mode types of remaining prediction modes are neither the DC mode nor the planar mode, N being an integer less than or equal to the preset number; or
determining the candidate mode subset based on top M prediction modes of the preset number of top-ranked prediction modes and the MPM subset, in response to determining that the mode type of one of top two prediction modes is the angle mode, and the mode type of the other is the DC mode or the planar mode, M being an integer less than or equal to the preset number; or
determining the candidate mode subset based on top L prediction modes of the preset number of top-ranked prediction modes and the MPM subset, in response to determining that the mode types of top two prediction modes are both the DC mode, both the planar mode, or the DC mode and the planar mode, L being an integer less than or equal to the preset number.

11. The electronic device of claim 10, wherein the at least one processor is further configured to:
determine the MPM subset as the candidate mode subset, in response to determining that the mode cost of the first prediction mode is the same as the mode cost of the second prediction mode.

12. The electronic device of claim 10, wherein the at least one processor is further configured to:
determine the mode types of a preset number of top-ranked prediction modes, in wherein the prediction modes contained in the set of rough prediction modes are ranked in an ascending order of the mode costs; and
determine the candidate mode subset based on the preset number of top-ranked prediction modes, in response to determining that the mode types of the preset number of top-ranked prediction mode meet a preset mode condition;
the preset mode condition comprising that: the mode types of top two prediction modes are both an angle mode, and the mode type of at least one of remaining prediction modes is a direct current mode (DC mode) or a planar mode.

13. The electronic device of claim 12, wherein the at least one processor is further configured to:
constitute the candidate mode subset by the top two prediction modes and at least one prediction mode from the set of rough prediction modes, wherein the at least one prediction mode corresponds to the DC mode, the planar mode, or both the DC mode and the planar mode.

14. The electronic device of claim 10, wherein the at least one processor is further configured to:
determine repeated modes between the top N, M or L prediction modes and the MPM subset; and
remove the repeated modes from the top N, M or L prediction modes and/or the MPM subset, and constitute the candidate mode subset by using remaining prediction modes.

15. The electronic device of claim 10, wherein the at least one processor is further configured to:
determine a respective rate distortion optimized cost, RDO cost, of each prediction mode in the candidate mode subset; and
determine the target prediction mode for the code block from the candidate mode subset based on the respective RDO cost.

16. A non-transitory computer-readable storage medium, having computer instructions stored thereon, wherein when the computer instructions are executed by a computer, the computer is caused to execute a method for image encoding, the method comprising:
determining a set of rough prediction modes for a code block during image encoding, wherein the set of rough prediction modes comprises a most probable mode (MPM) subset of the code block;
selecting a first prediction mode from the set of rough prediction modes, and selecting a second prediction mode from the MPM subset, a mode cost of the first prediction mode being less than a first threshold, and a mode cost of the second prediction mode being less than a second threshold;
determining a candidate mode subset based on mode types of prediction modes contained in the set of rough prediction modes and a ranking result of mode costs of prediction modes contained in the set of rough prediction modes, in response to determining that the mode cost of the first prediction mode is different from the mode cost of the second prediction mode;
determining a target prediction mode for the code block from the candidate mode subset; and
encoding the code block with the target prediction mode;
wherein determining the candidate mode subset based on the mode types of the prediction modes and the ranking result of mode costs of the prediction modes comprises:
determining the mode types of a preset number of top-ranked prediction modes, wherein the prediction modes contained in the set of rough prediction modes are ranked in an ascending order of the mode costs, and determining the candidate mode subset based on top N prediction modes of the preset number of top-ranked prediction modes and the MPM subset, in response to determining that the mode types of top two prediction modes are both the angle mode, and the mode types of remaining prediction modes are neither the DC mode nor the planar mode, N being an integer less than or equal to the preset number; or determining the candidate mode subset based on top M prediction modes of the preset number of top-ranked prediction modes and the MPM subset, in response to determining that the mode type of one of top two prediction modes is the angle mode, and the mode type of the other is the DC mode or the planar mode, M being an integer less than or equal to the preset number; or determining the candidate mode subset based on top L prediction modes of the preset number of top-ranked prediction modes and the MPM subset, in response to determining that the mode types of top two prediction modes are both the DC mode, both the planar mode, or the DC mode and the planar mode, L being an integer less than or equal to the preset number.

* * * * *